United States Patent
Ben-Zedeff et al.

(10) Patent No.: US 8,773,490 B2
(45) Date of Patent: Jul. 8, 2014

(54) SYSTEMS, METHODS, AND MEDIA FOR IDENTIFYING AND SELECTING DATA IMAGES IN A VIDEO STREAM

(75) Inventors: Sagee Ben-Zedeff, Givataim (IL); Yair Wiener, Qiryat Ono (IL)

(73) Assignee: Avaya Inc., Santa Clara, CA (US)

( * ) Notice: Subject to any disclaimer, the term of this patent is extended or adjusted under 35 U.S.C. 154(b) by 233 days.

(21) Appl. No.: 12/790,624

(22) Filed: May 28, 2010

(65) Prior Publication Data

US 2011/0292164 A1    Dec. 1, 2011

(51) Int. Cl.
*H04N 7/14* (2006.01)

(52) U.S. Cl.
USPC .................................. 348/14.01; 382/260

(58) Field of Classification Search
USPC ............... 348/14.01–14.08, 14.09, 180, 571; 725/118
See application file for complete search history.

(56) References Cited

U.S. PATENT DOCUMENTS

| | | | | |
|---|---|---|---|---|
| 5,875,428 | A * | 2/1999 | Kurzweil et al. | 704/260 |
| 6,839,048 | B2 * | 1/2005 | Park | 345/102 |
| 7,376,274 | B2 * | 5/2008 | Xiong | 382/218 |
| 7,394,938 | B2 * | 7/2008 | Erol et al. | 382/218 |
| 7,647,555 | B1 | 1/2010 | Wilcox et al. | |
| 7,983,489 | B2 * | 7/2011 | Aguera Y Arcas et al. | 382/220 |
| 2001/0042114 | A1 * | 11/2001 | Agraharam et al. | 709/223 |
| 2002/0106134 | A1 * | 8/2002 | Dundon et al. | 382/274 |
| 2005/0198570 | A1 | 9/2005 | Otsuka et al. | |
| 2005/0210105 | A1 | 9/2005 | Hirata et al. | |
| 2005/0289182 | A1 * | 12/2005 | Pandian et al. | 707/104.1 |
| 2006/0095841 | A1 * | 5/2006 | Oikawa | 715/531 |
| 2006/0095949 | A1 * | 5/2006 | Whish-Wilson et al. | 725/105 |
| 2008/0092168 | A1 | 4/2008 | Logan et al. | |
| 2008/0183507 | A1 * | 7/2008 | Lutnick et al. | 705/4 |
| 2010/0002066 | A1 * | 1/2010 | Nelson | 348/14.1 |
| 2010/0011297 | A1 | 1/2010 | Tsai et al. | |
| 2010/0169410 | A1 | 7/2010 | Lund et al. | |

OTHER PUBLICATIONS

International Search Report and Written Opinion; PCT/IB2011/01528; May 28, 2011; 6 pgs.
International Search Report and Written Opinion; PCT/IB2012/002082, Mar 4, 2013, 8 pages.

\* cited by examiner

*Primary Examiner* — Maria El-Zoobi

(57) ABSTRACT

Systems, methods, and media for identifying and selecting data images in a video stream are provided. In accordance with some embodiments, methods for identifying and selecting data images in a video stream are provided, the methods comprising: receiving a video bit stream representing a plurality of images; identifying, using a processor programmed to do so, sets of data images in the plurality of images, wherein each of the data images provides an image representation of data and each of the data images in any of the sets of data images corresponds to a single data image; and selecting at least one best data image from the sets of data images using a processor programmed to do so.

27 Claims, 5 Drawing Sheets

SYSTEMS, METHODS, AND MEDIA FOR IDENTIFYING AND SELECTING DATA IMAGES IN A VIDEO STREAM

TECHNICAL FIELD

The disclosed subject matter relates to systems, methods, and media for identifying and selecting data images in a video stream.

BACKGROUND

In various domains, data is shared between remote participants using existing video channels. To achieve this, data is captured, and then encoded using a standard video encoder as if it was natural video. The remote party receives the video and the data (e.g., as data images making up a data video) using a video decoder. However, in these scenarios, because the data is a real-time video stream, a user cannot easily browse the data (for instance, slides in a presentation), review data that was previously presented (for instance, when arriving late for a video conference), distribute data presented (for instance, during a video conference) after it was shared, etc.

SUMMARY

Systems, methods, and, media for identifying and selecting data images in a video stream are provided. In accordance with some embodiments, systems for identifying and selecting data images in a video stream are provided, the systems comprising: at least one processor programmed to: receive a video bit stream representing a plurality of images; identify sets of data images in the plurality of images, wherein each of the data images provides an image representation of data and each of the data images in any of the sets of data images corresponds to a single data image; and select at least one best data image from the sets of data images.

In accordance with some embodiments, methods for identifying and selecting data images in a video stream are provided, the methods comprising: receiving a video bit stream representing a plurality of images; identifying, using a processor programmed to do so, sets of data images in the plurality of images, wherein each of the data images provides an image representation of data and each of the data images in any of the sets of data images corresponds to a single data image; and selecting at least one best data image from the sets of data images using a processor programmed to do so.

In accordance with some embodiments, computer-readable medium containing computer-executable instructions that, when executed by a processor, cause the processor to perform a method for identifying and selecting data images in a video stream are provided, the method comprising: receiving a video bit stream representing a plurality of images; identifying sets of data images in the plurality of images, wherein each of the data images provides an image representation of data and each of the data images in any of the sets of data images corresponds to a single data image; and selecting at least one best data image from the sets of data images.

DETAILED DESCRIPTION

In accordance with various embodiments, mechanisms for identifying and selecting data images in a video stream are provided. These mechanisms can be used in a variety of applications such as to allow for online browsing of data images, to allow for late arrivals in a video conference to receive data that was previously shown, to allow for later distribution of data images provided in a video conference, and to allow browsing through a recorded video conference call using data images as an index.

Figure 1:
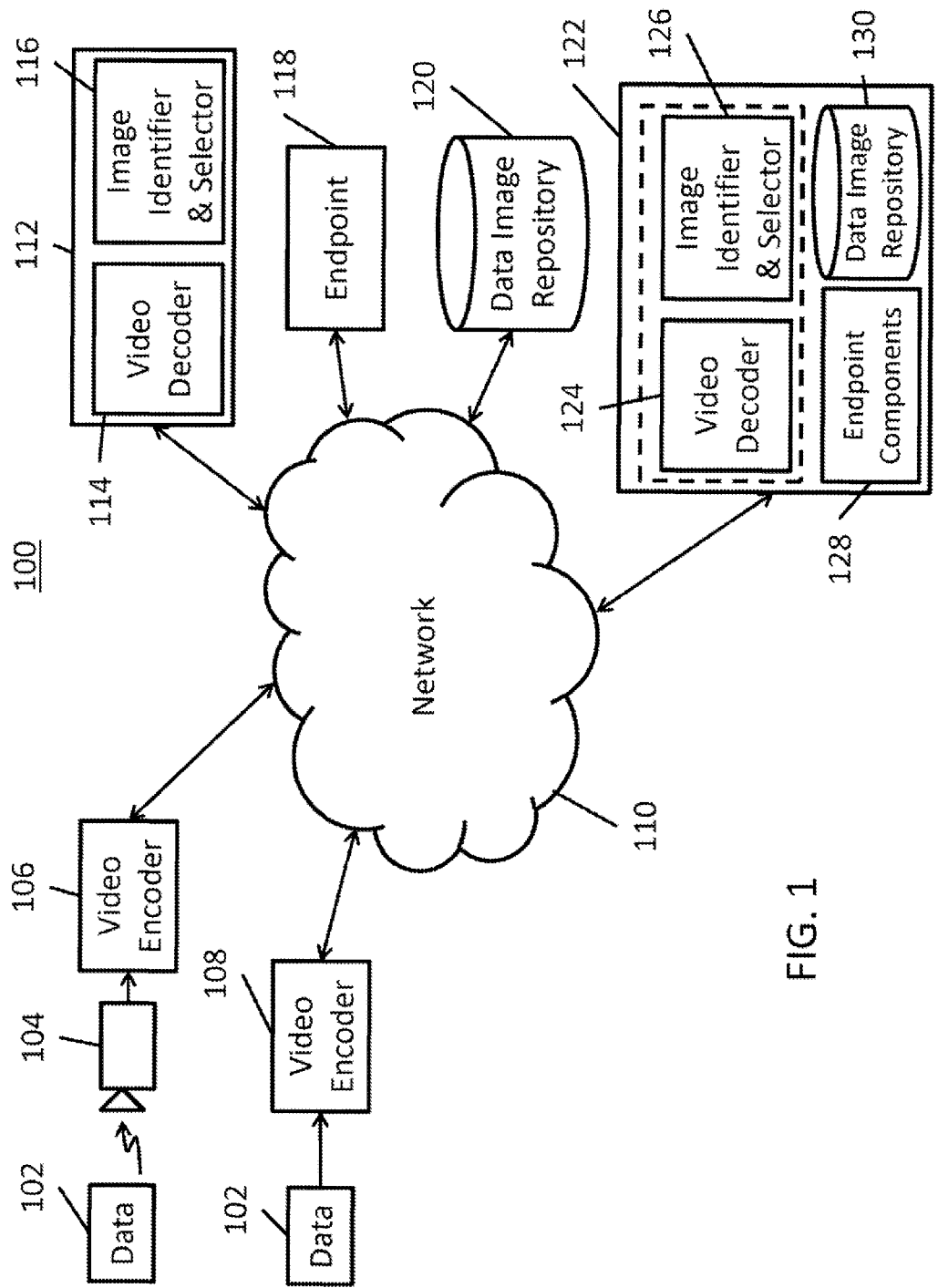
FIG. 1 is a diagram of hardware that can be used in some embodiments.

Turning to FIG. 1, an example of hardware 100 that can be used in some embodiments is illustrated. As shown, data 102 can be provided to a video encoder 106 using a camera 104 or data 102 can be provided to a video encoder 108 directly. The data can be any suitable data and may be in the form of a visual presentation (e.g., such as a POWERPOINT presentation). Camera 104 can be any suitable camera, such as a video camera. Video encoders 106 and 108 can be any suitable hardware and/or software video encoders and may utilize any suitable video encoding standard(s) and/or coder(s)/decoder(s) (codec(s)) for creating a video signal and/or compressing the signal. In some embodiments, camera 104 and/or video encoders 106 or 108 can be part of a video conferencing endpoint.

After the data is encoded, a bit stream may be provided by the video encoder. This bit stream may be transmitted via a network 110. Any suitable network and/or combination of networks may be used as network 110 in some embodiments. For example, network 110 may include the Internet, a wired network, a wireless network, a local area network, a wide area network, a telephone network, a cable network, a satellite network, a fiber optic network, etc. In some embodiments, network 110 can include any suitable equipment such as routers, firewalls, servers, proxy servers, multipoint conferencing units, gateways, etc.

The bit stream may be provided to a network appliance 112 and/or an endpoint 122 in some embodiments (e.g., via network 110, directly from encoder 106 or 108, etc.). Network appliance 112 may be any suitable device or part of any suitable device. For example, appliance 112 may be a server. Appliance 112 may include a video decoder 114 and an image identifier and selector 116. Endpoint 122 may be any suitable device or part of any suitable device. For example, endpoint 122 may be a computer that is configured as a video conferencing endpoint. Endpoint 122 may include a video decoder 124 and an image identifier and selector 126. Endpoint 122 may also include endpoint components 128 and a data image repository 130.

Video decoders 114 and 124 may be any suitable hardware and/or software video decoder for decoding the video bit stream into a series of video images. Video decoders 114 and 124 may utilize any suitable video encoding standard(s) and/or coder(s)/decoder(s) (codec(s)). For example, the video decoders may include a decoder that matches the encoder in video encoder 106 or 108.

Image identifier and selector 116 and 126 may be any suitable hardware and/or software for identifying and selecting images. For example, the image identifier and selector may identify and select images as described herein in connection with FIGS. 3 and 5.

Hardware 100 may also include an endpoint 118 and a data image repository 120. Endpoint 118 and endpoint components 128 may be any suitable hardware and/or software for implementing a video conferencing endpoint. Data image repository 120 and 130 may be any suitable storage mechanism for storing data images. For example, data image repository 120 and 130 may include a mass storage device (such as a disk drive, an optical drive, magnetic media, memory, etc.) and database logic (such as database hardware and/or software). In some embodiments, data image repository 120 and/or any other suitable storage device can include a recorded copy of a video conference of which a bit stream may be a part.

In some embodiments, various components (such as video encoders 106 and 108, video decoders 114 and 124, image identifier and selectors 116 and 126, endpoint 118, endpoint components 128, and data image repositories 120 and 130) of hardware 100 can be implemented in one or more general purpose devices such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc., and can be configured to operate in response to software instructions consistent with the functionality described herein.

Figure 2:
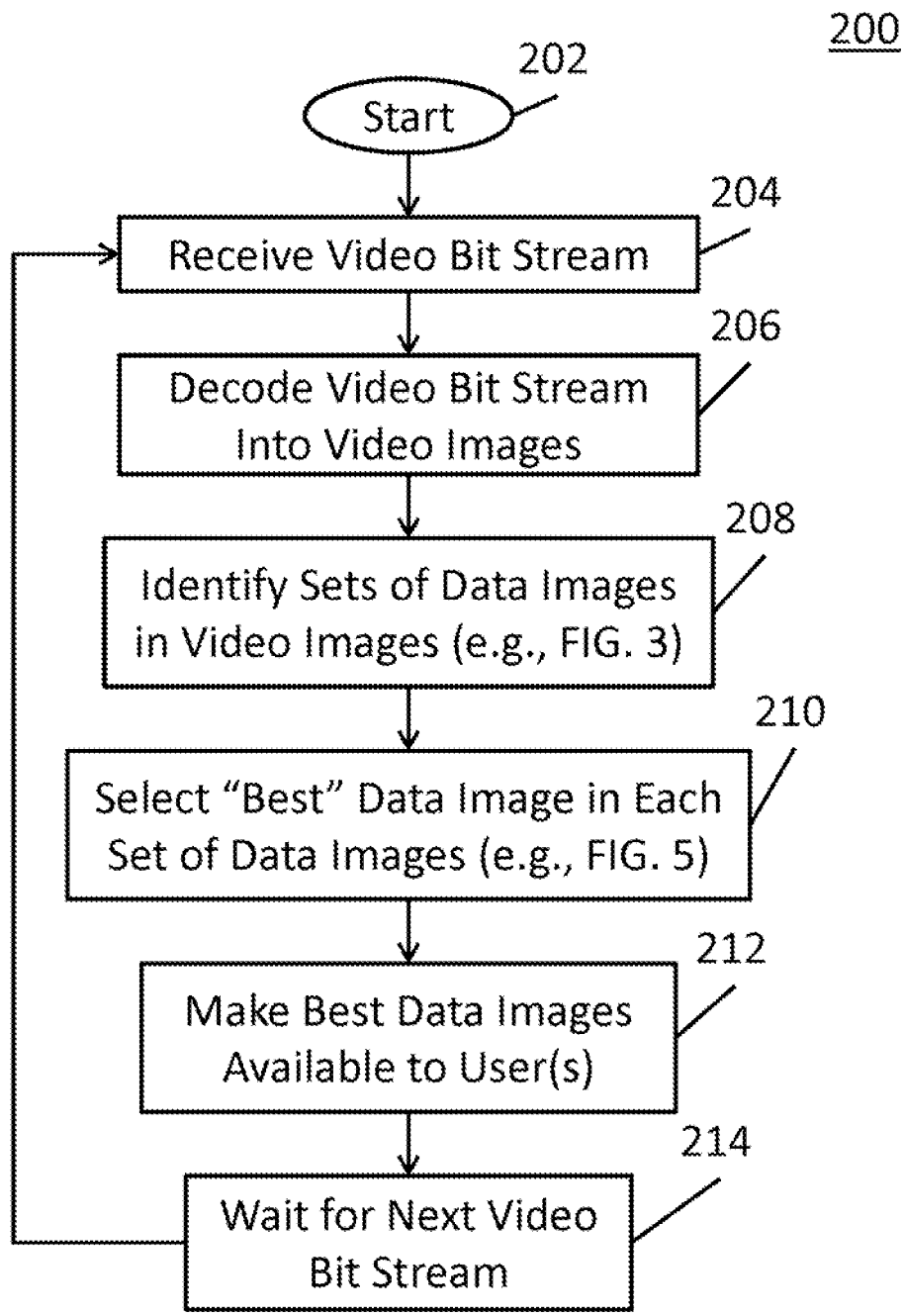
FIG. 2 is a diagram of a process for processing a video bit stream in accordance with some embodiments.
Figure 3:
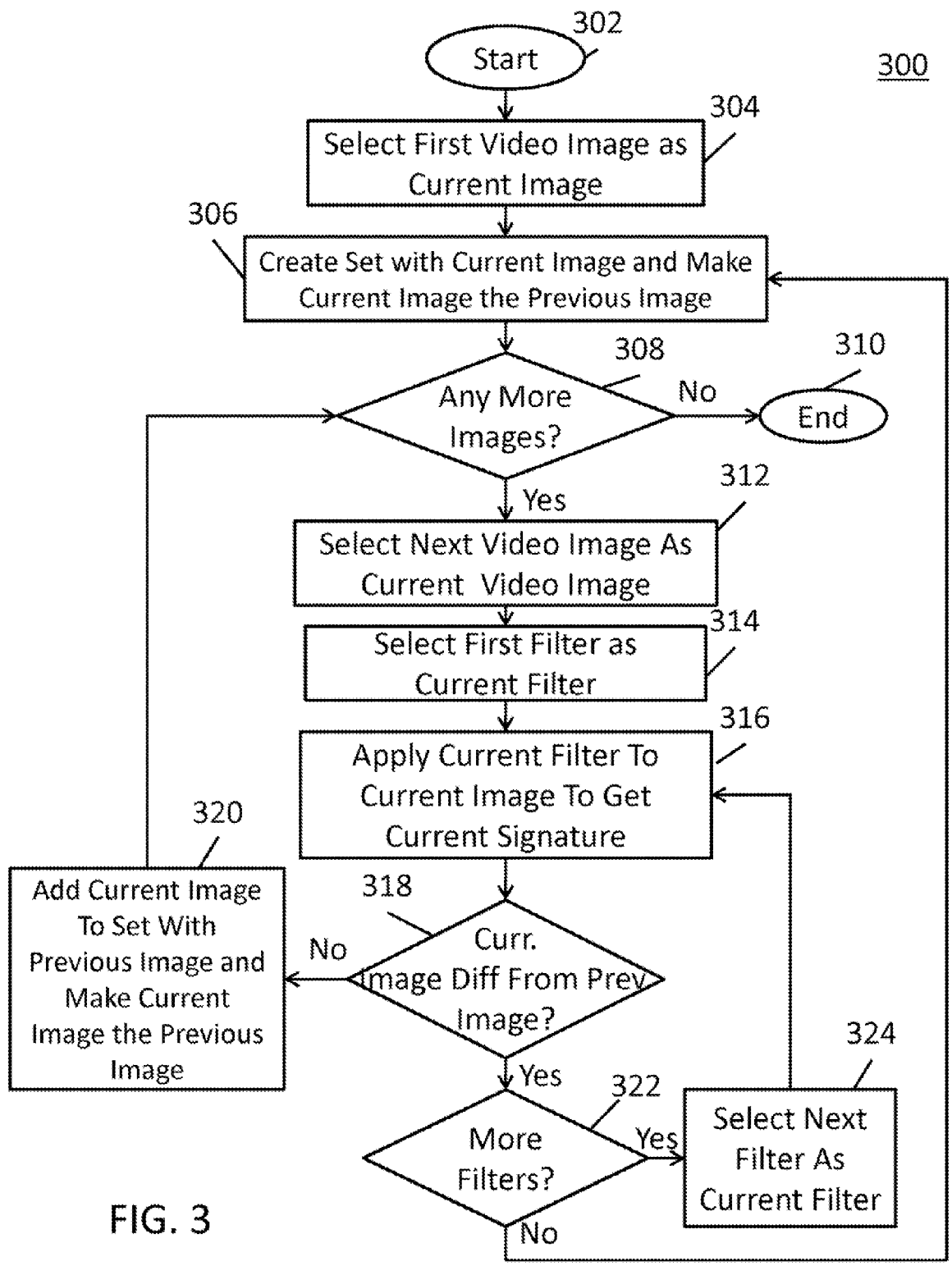
FIG. 3 is a diagram of a process for identifying sets of data images in accordance with some embodiments.

FIG. 2 illustrates an example of a process 200 that can be performed by network appliance 112 and/or endpoint 122 in some embodiments. As shown, after process 200 begins at 202, the process receives a video bit stream at 204. The video bit stream can be received in any suitable manner, such as through a transmission over network 110. Next, at 206, the video bit stream can be decoded into video images. Any suitable decoding can be used in some embodiments. Then, sets of data images can be identified in the video images at 208. Any suitable approach to identifying data images can be used in some embodiments. For example, sets of data images can be identified using a process 300 as illustrated in FIG. 3.

In some embodiments, process 300 can use filters to evaluate video images. For example, filters can be used to determine if a current image is different from a previous image by comparing signatures for the images. Any number of signatures (including none) can be used in a filter, and different filters can use different signatures. A signature can be any suitable representation of an image. For example, in some embodiments, a signature can be derived from coding information available for the image, such as frame type, frame size, macro block (MB) types, etc., and/or pixel-level information for the image, such as average pixel intensity, pixel diversity, etc. In some embodiments, what a signature is based on can be predetermined, can be determined arbitrarily, or can be determined based on content of an image. For example, assuming average pixel intensity for a column is a signature for a certain filter, column selection can be arbitrary (for example, every n-th column) or according to, the content in the image (for example, based on pixel diversity in each column).

Different filters can have different levels of complexity C, in some embodiments, in order to achieve different rates of false positives FP and false negatives FC. False positives are data images that are detected as not matching other data images, but in fact do match. False negatives are data images that do not match other data images, but are detected as matching.

In some embodiments, filters can be used in a sequential order of passes on an image so that the first filter is the least complex, the next filter is more complex, and subsequent filters are progressively more complex. In this way, if a first filter can be used to determine that a current image is the same as a previous image, then more complex filters do not need to be used.

Figure 4:
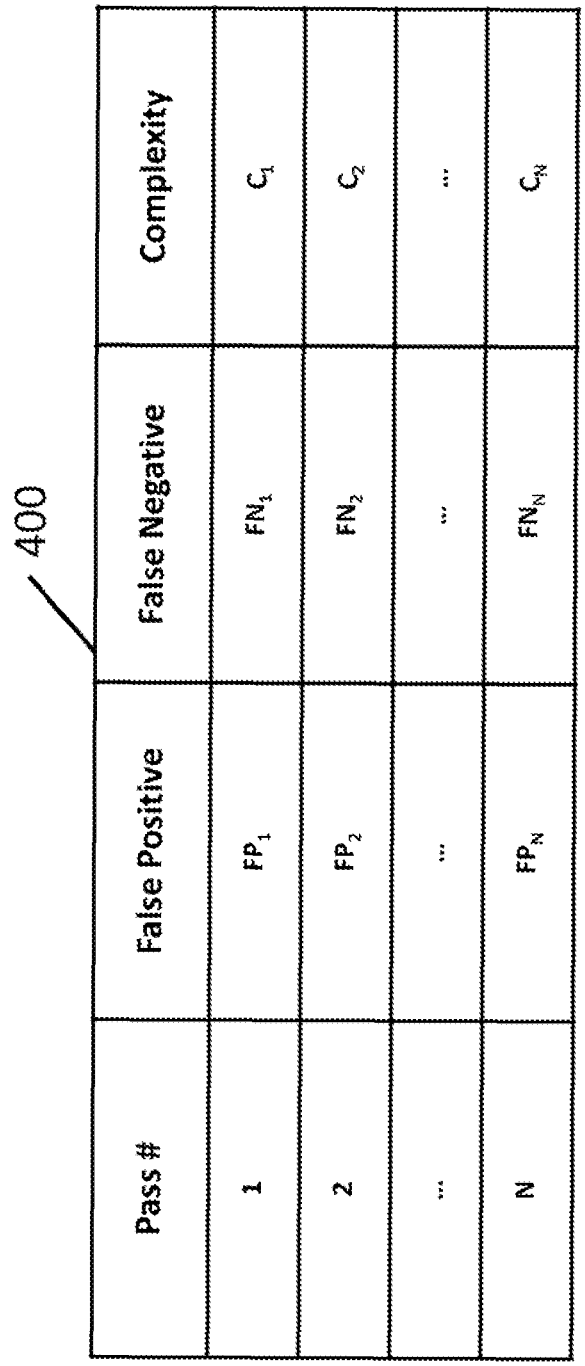
FIG. 4 is a diagram of a table showing filter passes and false positive rates, false negative rates, and complexities associated with those filter passes in accordance with some embodiments.

FIG. 4 shows a table 400 providing an example of filters for passes 1 through N that can be used to evaluate an image. These filters can have false positive rates $FP_1$ through $FP_N$, false negative rates $FN_1$ through $FN_N$, and complexities $C_1$ through $C_N$, where $FP_1 > FP_2 > \ldots > FP_N$, $FN_1 <= FN_2 <= FN_N$, and $C_1 < C_2 < \ldots < C_N$.

Returning to FIG. 3, after process 300 begins at 302, the process can select a first video image as a current image at 304. Next, process 300 can create a set with the current image and make the current image the previous image at 306. Then, at 308, process 300 can determine if there are any more images, and, if not, end at 310. Otherwise, process 300 can select the next video image as the current image at 312.

Next, at 314, a first filter can be selected as a current filter. The first filter can be selected based on any suitable criteria or criterion, such as level of complexity, false positive rate, false negative rate, signature used, etc. The current filter can then be applied against the current image to get one or more current signatures at 316. As described above, any suitable type of signature can be obtained.

Process 300 can next determine if the current image is different from the previous image at 318. Any suitable approach to making this determination can be used in some embodiments. For example, process 300 can compare the signatures of the current image and the previous image to determine if they are different (versus being identical or similar). If the current image is determined to be the same as the previous image, then process 300 can add the current image to a set with the previous image and make the current image the previous image at 320 and then branch to 308.

If the current image is determined to not be the same as the previous image, then process 300 can determine if there are any more filters to be applied at 322. If so, then process 300 can select the next filter as the current filter at 324 and loop back to 316. Otherwise, process can loop back to 306 to create a set with the current image and make the current image the previous image.

In some embodiments, animation, sharpening, and other video effects that may be present in data images can be ignored when comparing a current image to a previous image in order to determine whether they should be in the same set. Any suitable approach to determining what animation, sharpening, or other video to ignore, and how to do so, can be used in some embodiments.

Turning back to FIG. 2, after sets of data images have been identified at 208, such as using process 300 of FIG. 3, process 200 can select the best data image in each set of data images at 210. Any suitable approach to determining the best data images can be used in some embodiments. For example, the best data images in each set of data images can be selected using a process 500 as illustrated in FIG. 5 in some embodiments.

Figure 5:
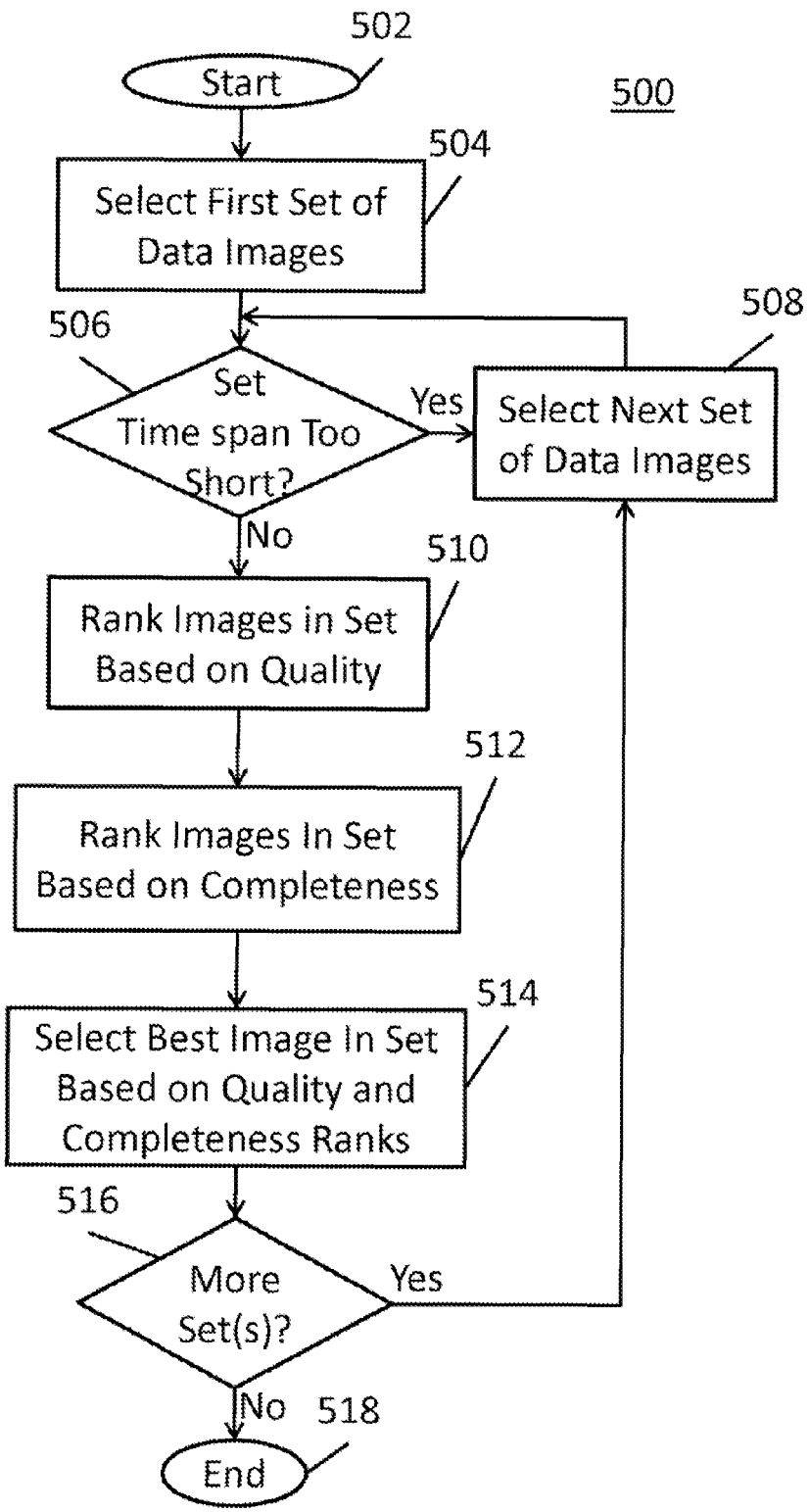
FIG. 5 is a diagram of a process for selecting best data images in sets of data images in accordance with some embodiments.

As shown in FIG. 5, after process 500 begins at 502, the process can select the first set of data images at 504. Next, the process can determine, at 506, if the time span across which the images were taken is too short. For example, if a data image appeared for half a second, then the image would not be viewable to a human and thus the image is unlikely to be a valid data image. Any suitable time frame can be used as a basis for determining whether the time span is too short in some embodiments. If it is determined that the time span was too short, then process 500 can select the next set of data images at 508 and repeat the time span evaluation at 506.

If it is determined at 506 that the time span for the set is not too short, then process 500 can rank the images in the set based on quality at 510. Any suitable mechanism can be used to determine the quality of the images. For example, if a series of images in a set have varying levels of sharpness (e.g., because bandwidth limitations have affected sharpness), then the image with the best sharpness can be selected as having the best quality.

Next, at 512, process 500 can rank the images in the set based on completeness. Any suitable mechanism can be used to determine the completeness of the images. For example, if data is progressively added to a blank table (for example) in a series of images in a set, the image with the most complete set of data (e.g., the last image) can be selected has having the best completeness.

The best image in the current set can next be selected, at 514, based on the rankings of quality and completeness. For example, a weighted sum of the rankings can be used to find the best image. Alternatively, in some embodiments, only one of these rankings can be used, or some other factor can be used, to select the best image. In some embodiments, an image can even be selected as the best image arbitrarily, for example, by random (or pseudo random) selection, by being the last image in a set, etc.

At 516, process 500 can determine if there are any more sets of images, and, if so, select the next set at 508 and loop back to 506. Otherwise, if there are no more sets, then process 500 can end at 518.

Turning back to FIG. 2, after selecting the best images at 210, process 200 can make the best images available to one or more users at 212. Any suitable approach to doing this can be used in some embodiments. For example, process 200 can store the best images in data image repositories 120 and/or 130. After making the best images available to users at 212, process 200 can wait for the next video bit stream at 214 and then loop back to 204.

Turning back to FIG. 1, in some embodiments, endpoint 118 and/or 122 (the endpoints) can enable a user to perform certain functions based on the best data images being made available to users. For example, the endpoints (and/or any computer) can enable a user to perform online browsing of data, can allow for late arrivals in a video conference to receive data that was previously shown, can be used to receive data provided in a video conference after the video conference is over, and can allow selection of a portion of a recorded video conference call based on a selection of data that corresponds to it.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for identifying and selecting data images in a video stream, comprising:
at least one processor programmed to, during real-time streaming of the video stream:
receive a video bit stream representing a plurality of images;
identify sets of data images in the plurality of images by using a first filter to determine a signature of a first image and of a second image and by comparing said signatures of said first image and said second image, wherein each of the data images provides an image representation of data and each of the data images in any of the sets of data images corresponds to a single data image;
determine if a time span during which a set of data images is viewable is below a threshold; and
in response to determining that a time span during which a set of data images is viewable is not below a threshold, select at least one best data image from each set of the sets of data images.

2. The system of claim 1, wherein said signatures of said first image and said second image comprise predetermined information.

3. The system of claim 2, wherein the at least one processor is also programmed to apply a second filter to identify the sets of data images by using said second filter to determine a second signature of said first image and by comparing said second signature of said first image with said signature of said second image and wherein said first filter is less complex than said second filter.

4. The system of claim 1, further comprising, in response to determining that a time span during which a set of data images is viewable is below a threshold, the at least one processor is programmed to not select at least one best data image from the set of data images associated with the time span below the threshold.

5. The system of claim 1, wherein selecting the best data images includes evaluating the quality of data images in the sets of data images, said evaluation of the quality of data images in the sets of data images comprises ranking said data images in a selected set of said sets of data images by determining the quality of images in said selected set and by determining the completeness of images in said selected set.

6. The system of claim 1, wherein the video bit stream is a component of a video conference call, and wherein the at least one processor is also programmed to enable a participant in the video conference call to view at least one image from the at least one best data image after the at least one image is no longer being represented in the video bit stream.

7. The system of claim 6, wherein the at least one image is stored on a server.

8. The system of claim 1, wherein the video bit stream is a component of a video conference call, and wherein the at least one processor is also programmed to distribute a set of at least two of the best data images to at least one participant of the conference call.

9. The system of claim 1, wherein the video bit stream is a component of a recorded video call, and wherein the at least one processor is also programmed to enable a viewer to select a portion of the video call to be viewed based on a selection of one of the at least one best data image.

10. A method for identifying and selecting data images in a video stream, comprising:
during real-time streaming of the video stream:
receiving a video bit stream representing a plurality of images;
identifying, using a processor programmed to do so, sets of data images in the plurality of images by using a first filter to determine a signature of a first image and of a second image and by comparing said signatures of said first image and said second image, wherein each of the data images provides an image representation of data and each of the data images in any of the sets of data images corresponds to a single data image;
determining if a time span during which a set of data images is viewable is below a threshold; and
in response to determining that a time span during which a set of data images is viewable is not below a threshold, selecting at least one best data image from each set of the sets of data images using a processor programmed to do so.

11. The method of claim 10, wherein said signatures of said first image and said second image comprise predetermined information.

12. The method of claim 11, further comprising applying a second filter to identify the sets of data images wherein said second filter determines a second signature of said first image and compares said second signature of said first image with said signature of said second image and wherein said first filter is less complex than said second filter.

13. The method of claim 10, further comprising, in response to determining if that a time span during which a set of data images is viewable is below a threshold, excluding the set of data images associated with the time span below the threshold from the selecting of at least one best image.

14. The method of claim 10, wherein selecting the best data images includes evaluating the quality of data images in the sets of data images, said process of evaluating the quality of data images in the sets of data images comprises ranking said data images in a selected set of said sets of data images by determining the quality of images in said selected set and by determining the completeness of images in said selected set.

15. The method of claim 10, wherein the video bit stream is a component of a video conference call, further comprising enabling a participant in the video conference call to view at least one image from the at least one best data image after the at least one image is no longer being represented in the video bit stream.

16. The method of claim 15, wherein the at least one image is stored on a server.

17. The method of claim 10 wherein the video bit stream is a component of a video conference call, further comprising distributing a set of at least two of the best data images to at least one participant of the conference call.

18. The method of claim 10 wherein the video bit stream is a component of a recorded video call, further comprising enabling a viewer to select a portion of the video call to be viewed based on a selection of one of the at least one best data image.

19. A non-transitory computer-readable medium containing computer-executable instructions that, when executed by a processor, cause the processor to perform a method for identifying and selecting data images in a video stream, the method comprising:
during real-time streaming of the video stream:
receiving a video bit stream representing a plurality of images;
identifying sets of data images in the plurality of images by using a first filter to determine a signature of a first image and of a second image and by comparing said signatures of said first image and said second image, wherein each of the data images provides an image representation of data and each of the data images in any of the sets of data images corresponds to a single data image;
determining if a time span during which a set of data images is viewable is below a threshold; and
in response to determining that a time span during which a set of data images is viewable is not below a threshold, selecting at least one best data image from each set of the sets of data images.

20. The medium of claim 19, wherein said signatures of said first image and said second image comprise predetermined information.

21. The medium of claim 20, wherein the method further comprises applying a second filter to identify the sets of data images by using said second filter to determine a second signature of said first image and by comparing said second signature of said first image with said signature of said second image and wherein said first filter is less complex than said second filter.

22. The medium of claim 19, wherein the method further comprises, in response to determining if that a time span during which a set of data images is viewable is below a threshold, excluding the set of data images associated with the time span below the threshold from the selecting of at least one best image.

23. The medium of claim 19, wherein selecting the best data images includes evaluating the quality of data images in the sets of data images, said evaluation of the quality of data images in the sets of data images comprises ranking said data images in a selected set of said sets of data images by determining the quality of images in said selected set and by determining the completeness of images in said selected set.

24. The medium of claim 19, wherein the video bit stream is a component of a video conference call, and wherein the method further comprises enabling a participant in the video conference call to view at least one image from the at least one best data image after the at least one image is no longer being represented in the video bit stream.

25. The medium of claim 24, wherein the at least one image is stored on a server.

26. The medium of claim 19, wherein the video bit stream is a component of a video conference call, and wherein the method further comprises distributing a set of at least two of the best data images to at least one participant of the conference call.

27. The medium of claim 19, wherein the video bit stream is a component of a recorded video call, wherein the method further comprises enabling a viewer to select a portion of the video call to be viewed based on a selection of one of the at least one best data image.

* * * * *